United States Patent [19]

Heinke et al.

[11] Patent Number: 5,344,540
[45] Date of Patent: Sep. 6, 1994

[54] ELECTROCHEMICAL CELL WITH DEGASSING DEVICE

[75] Inventors: Harri Heinke, Erlensee; Wolfgang Blatt, Wächtersbach, both of Fed. Rep. of Germany

[73] Assignee: Heraeus Elektrochemie GmbH, Hanau, Fed. Rep. of Germany

[21] Appl. No.: 10,425

[22] Filed: Jan. 28, 1993

[30] Foreign Application Priority Data

Jan. 29, 1992 [DE] Fed. Rep. of Germany ....... 4202480

[51] Int. Cl.⁵ .................................................. C25B 9/00
[52] U.S. Cl. .................................... 204/232; 204/269; 204/270; 204/275; 204/278
[58] Field of Search ............... 204/202, 278, 275, 232, 204/237, 284, 288, 286, 297 R, 269, 270

[56] References Cited

U.S. PATENT DOCUMENTS

| | | | |
|---|---|---|---|
| 3,959,111 | 5/1976 | Mardine et al. | 204/258 |
| 4,033,832 | 7/1977 | Sterling et al. | 204/275 |
| 4,422,919 | 12/1983 | Fabian et al. | 204/270 |
| 4,427,505 | 1/1984 | Stevens | 204/109 |
| 4,804,452 | 2/1989 | Rhodes | 204/238 |

FOREIGN PATENT DOCUMENTS

| | | |
|---|---|---|
| 1132341 | 6/1962 | Fed. Rep. of Germany . |
| 2719427 | 11/1978 | Fed. Rep. of Germany . |
| 285824 | 5/1929 | United Kingdom . |

*Primary Examiner*—Kathryn Gorgos
*Attorney, Agent, or Firm*—Frishauf, Holtz, Goodman & Woodward

[57] ABSTRACT

An electrochemical cell for electrolytic treatment of aqueous solutions, particularly for cyanide detoxification or oxidation, has a solution container with a cell housing mounted on it, in which an electrode stack is located. Solution is delivered to the cell housing in the region of its housing bottom by a circulation device, and after passing through the electrode stack by an overflow over the side walls of the cell housing, is delivered to a cascadelike drain container with its own overflow for the sake of degassing; after passing through the second overflow, the now largely degassed solution is returned to the solution container and recirculated. The invention provides a compact structural form with a pressure-free recirculation system and simple maintenance of the electrode stack or individual electrodes.

9 Claims, 4 Drawing Sheets

ELECTROCHEMICAL CELL WITH DEGASSING DEVICE

Cross-reference to related patents and applications, the disclosure of which are hereby incorporated by reference: U.S. Pat. No. 4,422,919, FABIAN et al./W. C. HERAEUS GmbH, Dec. 27, 1983, corresponding to German Patent DE 31 38 438, issued Jul. 5, 1984;
U.S. Ser. No. 07/632,039 (attorney docket no. 900917-MO/RB);
U.S. Ser. No. 07/916,877 (attorney docket no. 920126PCT-MO);
U.S. Ser. No. 07/923,941 (attorney docket no. 920224PCT-MO);
U.S. Ser. No. 07/934,682 (attorney docket no. 920293PCT-MO).

FIELD OF THE INVENTION

The invention relates to an electrochemical cell for electrolytic treatment of aqueous solutions, particularly for cyanide detoxification, oxidation or electrolysis of a sodium chloride solution, in which a cell housing includes elongated platelike electrodes, spaced apart from and parallel to one another, in the form of an interchangeable electrode stack, with adjacent electrodes that have alternating polarity meshing with one another in comblike fashion, and all the electrodes of the same polarity are secured to a power feeder, serving to provide electrical contact and mechanical retention, by means of power leads of solution-resistant material welded laterally to them, and a liquid circulating device is provided to provide a flow from bottom to top of the electrodes along their electrode surface, and a degassing device with a separate liquid drain and a separate gas vent and a degassing container is provided.

BACKGROUND

U.S. Pat. No. 4,422,919, FABIAN et al. and corresponding German Patent 31 38 438 disclose a compact, direct through-flow cell with an easily exchangeable electrode stack, in which the cell can be adapted to the needs of the particular user by varying such parameters as the salt concentration, throughput, and so forth; by means of a low salt concentration and a high throughput, for instance, a high salt yield can be attained; alternatively, a high current yield can be achieved by means of a high salt concentration and a low throughput.

In such an arrangement, it was shown to be problematic that the flow speed of the liquid flow must be slower than the speed with which the gas bubbles contained in the solution rise, in order to assure complete degassing. The gas bubbles are guided along the elongated, cartridge-like electrode surfaces, so that the electrolyte required for the electrochemical reaction is partly forced away from the active electrode surface. Moreover, sealing provisions are necessary in the region of the electrode stack, to prevent the solution, which is under pressure, from escaping.

THE INVENTION

It is an object of the invention to provide an electrochemical cell with an open system for easy degassing, in which heat build-ups and consequent leaks at power lead-throughs are avoided; simple and reliable servicing should also be possible, and in particular a fast change of electrodes upon deactivation or a simple removal of electrodes to check the electrode surface should be provided, along with the capability of replacing a complete electrode package; moreover, it should also be possible to clean the electrodes during operation.

The invention is suitable for treating aqueous solutions, particularly for cyanide detoxification, but also for other electrolytic oxidation systems and for solutions having a residual content of metal ions in the ppm range, and for electrolysis of sodium chloride, for producing hypochloride solution and for sterilizing process water.

One essential advantage of the invention is that the electrolyte circulation is performed with a closed pressure system, so that not only is there rapid degassing of the liquid by means of the degassing segments extending through the system, but special sealing provisions in the region of the electrodes or their power feeders can also be dispensed with; a further advantage of such an open circulation system is that the cell degassing device is an integral superstructure of the cell housing.

In a preferred embodiment, there are two successive degassing lips in the direction of flow of the liquid emerging from the cell housing, which advantageously makes a considerable improvement in degassing possible.

In another preferred embodiment, the power feeders are formed as contact strips, which are each mounted in the region of the lateral short sides of the electrode plates, alternating in polarity, by being welded to the electrode surface; the free ends of the contact strips are joined together above the cell housing in the region where the power lead is connected, so that they can be detachably electrically connected to one another by exerting contact pressure.

This embodiment has the advantage that the current density in the individual contact strips is relatively low, since each contact strip needs to provide power to only a single electrode, and the junction resistance in the vicinity of the detachable connection to the power lead is located outside the solution and thus is protected against corrosion, yet on the other hand is also readily detachable.

In another preferred embodiment, only two opposed side walls of the cell housing are formed as an overflow, so that the solution emerging from the cell housing is carried via a second overflow into one of the collection containers disposed on both sides of the cell housing at a time; after passing through the particular second overflow, the now-degassed solution returns via drain openings to the solution container.

With this kind of arrangement, a space-saving, compact design can advantageously be achieved.

A BRIEF DESCRIPTION OF THE DRAWINGS

Exemplary embodiments of the invention are illustrated in the drawings, and explained in detail by means of FIGS. 1 to 4.

DETAILED DESCRIPTION

Figure 1:
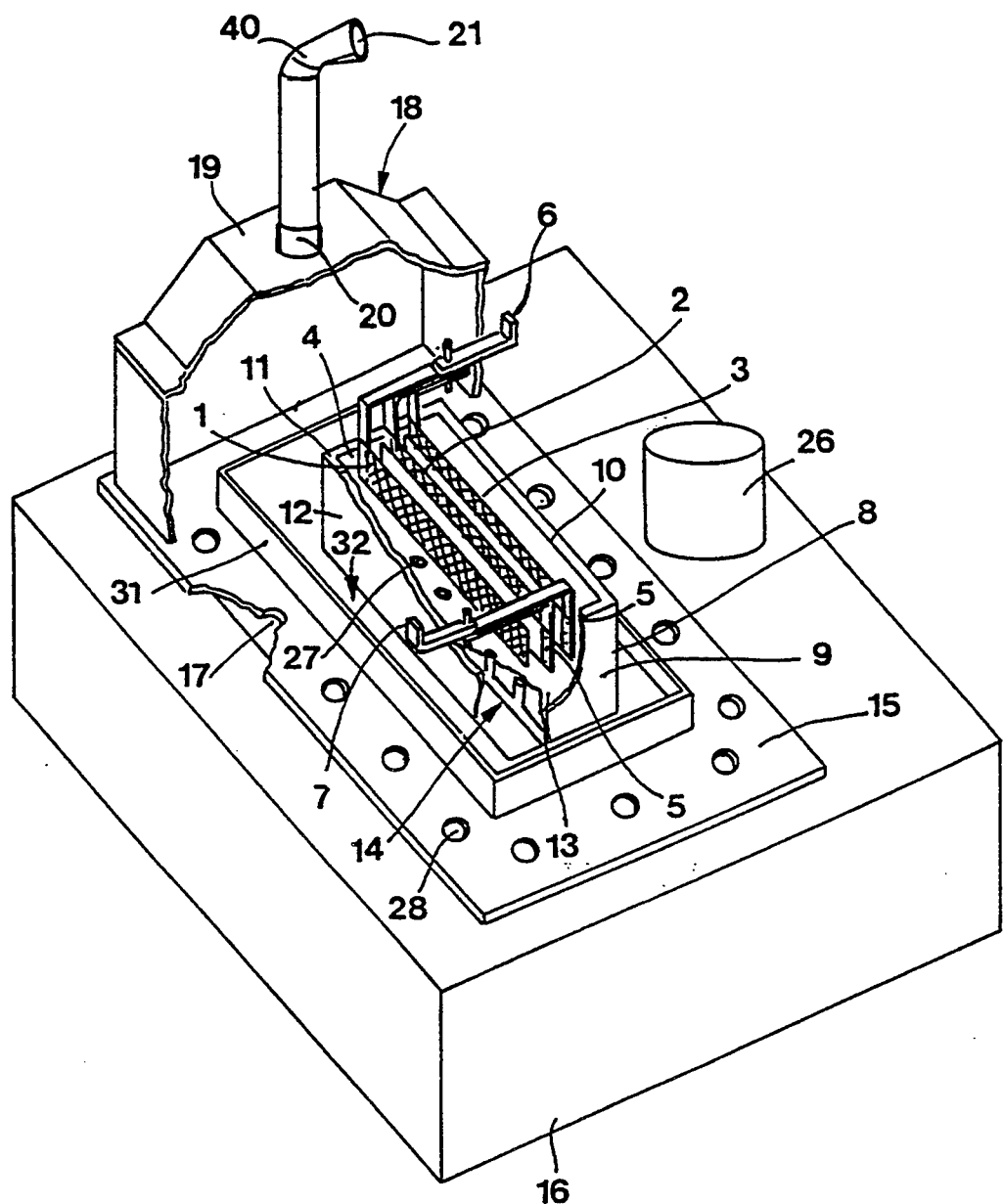
FIG. 1 is a perspective view of a detail of the electrode stack and/of the tub-shaped cell housing surrounding it, along with the cell housing carrier resting on a trough.

FIG. 1, in a partially cutaway, exploded perspective drawing, shows the electrode stack 3, comprising platelike anodes 1 and plate-like cathodes 2, along with the power feeders 4, each welded on in the region of the side edges of the anodes, and the power feeders 5 disposed on the opposite side edges of the electrode stack and welded to the cathodes 2. The power feeders 4, 5 are joined together above the electrode plates 1, 2 and pressed together by screws, serving as fasteners, and are electrically conductively and mechanically detachably connected to power leads 6, 7 which at the same time act as a retainer. The electrode stack 3 can be lowered into a tublike cell housing 8 far enough that the upper edges of the anodes 1 and cathodes 2 come to rest below the upper edges of the side walls 9, 10, 11 and 12 of the tublike cell housing 8. The bottom 13 of the cell housing 8 has a flat or U-shaped profile in cross section and is joined in its lower region, via outlet openings 27, to a pipe distributor system 14 in order to circulate the solvent by means of a pump 26 shown symbolically here. The cell housing 8 is surrounded by a plate-like cell housing carrier 15, which with its outer peripheral face covers the upwardly oriented opening 17 of a solvent container 16.

The cell housing 8 is surrounded by an a further wall defining additional overflow 31 secured to the cell housing carrier 15, thereby forming a sump or collection container 32 with a cascade-like degassing segment for the solution spilling over the upper edges of the side walls 9, 10, 11, 12. This means that after the electrolytic treatment, the solution first drops over a first lip in cascading fashion onto the region of the cell housing carrier outlined by the additional overflow lip 31 and from there flows onward in the direction of the additional overflow. Because the solution overflows and drops twice each time in cascade-like fashion, the solution is adequately degassed, and after passing through the additional overflow 31, it passes through the drain openings 28 and the opening 17, shown only in part, to return back to the solution container.

Above the tublike cell housing 8 on the cell housing carrier 15, a gas exhaust hood 18 of trapezoidal cross section is provided, whose center part 19, located in the upper region, is provided with openings 20 to which gas exhaust lines 21 can be connected. A hydrogen sensor 40 may be inserted for monitoring purposes in the region of the opening 20 or gas exhaust line 21.

In practice, the cell housing 8, cell housing carrier 15 and overflow 31 are an integral component.

Figure 2:
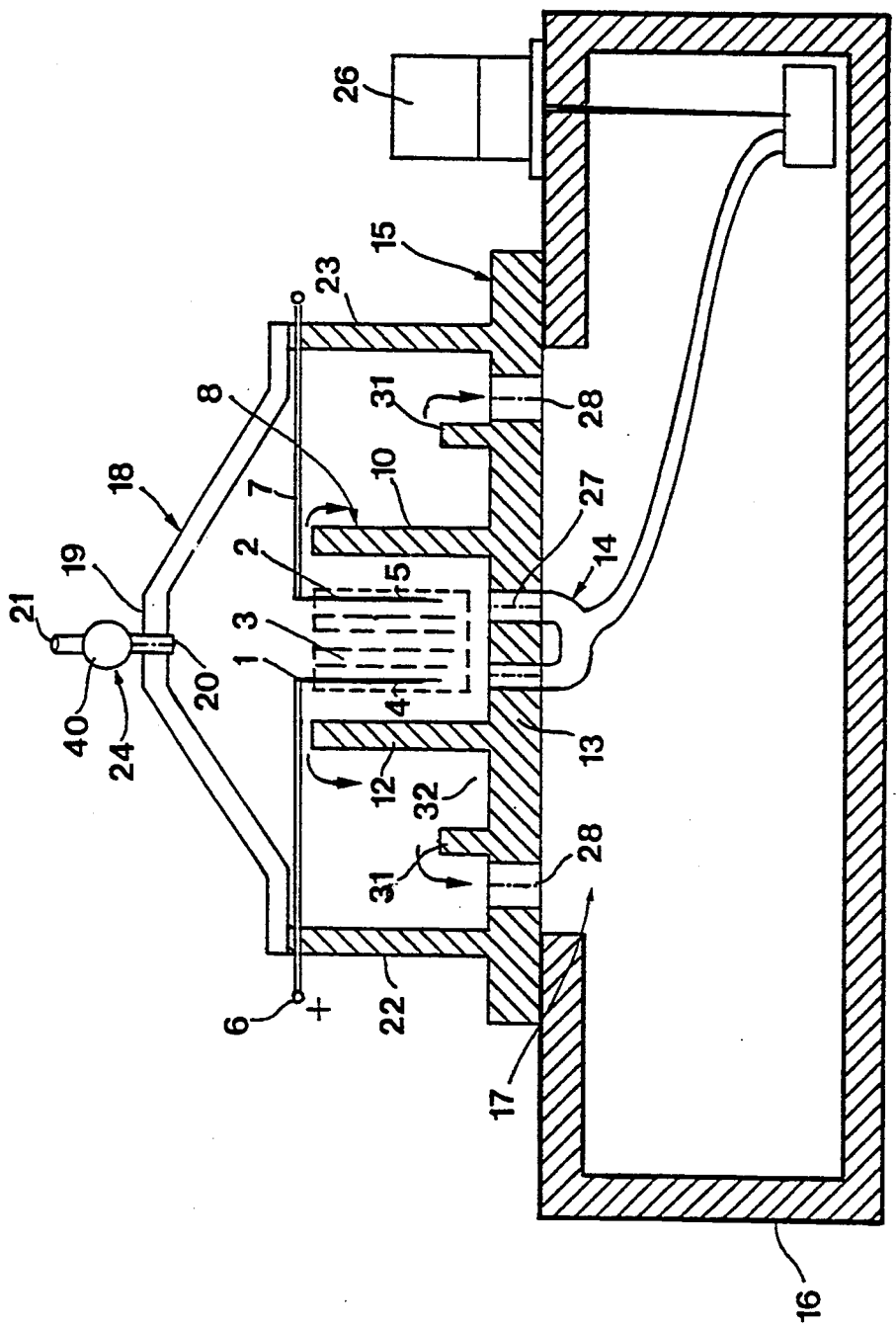
FIG. 2 is a cross-sectional view of the electrode stack, cell housing, cell housing carrier, and the trough and circulation device, along with the degassing device.

In FIG. 2, the electrode stack 3 is retained on the side walls 22, 23, carrying the gas exhaust hood 18, on the gas exhaust device 24 by means of the power leads 6, 7. It can be seen from the cross section of the electrode stack 3 that anodes and cathodes are interdigited in alternation and are connected to the respective power leads 6, 7 via power feeders 4 and 5. In the immediate vicinity of the cell housing 8 and the additional overflow 31, the cell housing carrier 15 has drain openings 28, which carry the electrolyte or solution emerging from the cell housing 8 into the solution container 16 located below the cell housing carrier. The liquid spilling out of the cell housing 8 by overflow thus passes through two degassing segments succeeding one another in cascade fashion in the flow direction. The pump 26 connected to the pipe distributor system 14 can also be seen; it pumps solution out of the solution container 16 into the tublike cell housing 8 via the pipe distributor system 14. The delivery of solvent to the container is done via the opening 27 and its removal is done via the opening 28.

Figure 3:
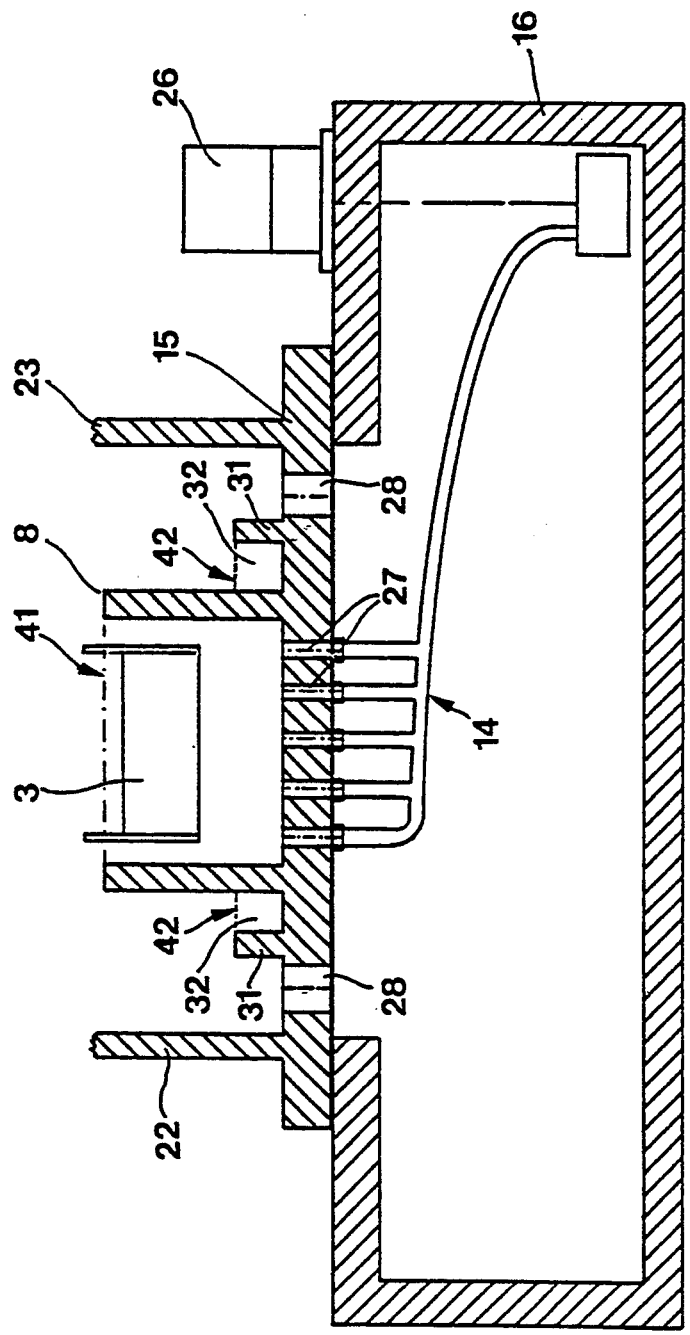
FIG. 3 is a longitudinal section through the electrode stack, cell housing add trough.

FIG. 3 shows the device, explained in conjunction with FIGS. 1 and 2, in longitudinal section, and the relationship between the height and width of the cathodes and anodes of the electrode packet 3 can be seen. A height to width ratio in the range from 1:6 to 1:8 is preferably selected. From this figure, it can be seen how this solution in the cell housing 8 is carried over the entire width of the electrodes by means of the pipe distributor system, while the gas bubbles produced during the electrolytic reaction are rapidly removed from the electrode region, and thus positively displace only a small portion of the solvent liquid that moistens the electrode surface. Once again, the opening 27 for delivering the solution and the opening 28 for removing the solution can be seen; by means of the pump 26, the pipe distributor system 14 is supplied across the full width of the lower edge of the electrodes. The gases produced are removed by means of the gas exhaust hood, already described in conjunction with FIG. 2, via the gas vent 21; the side walls 22, 23 prevent the gas from escaping laterally. The level of liquid in the cell housing 8 is indicated by reference numeral 41, while the level of the liquid in the collection container 32 is indicated by reference numeral 42. The associated gas exhaust device is not shown here, for the sake of simplicity.

Figure 4:
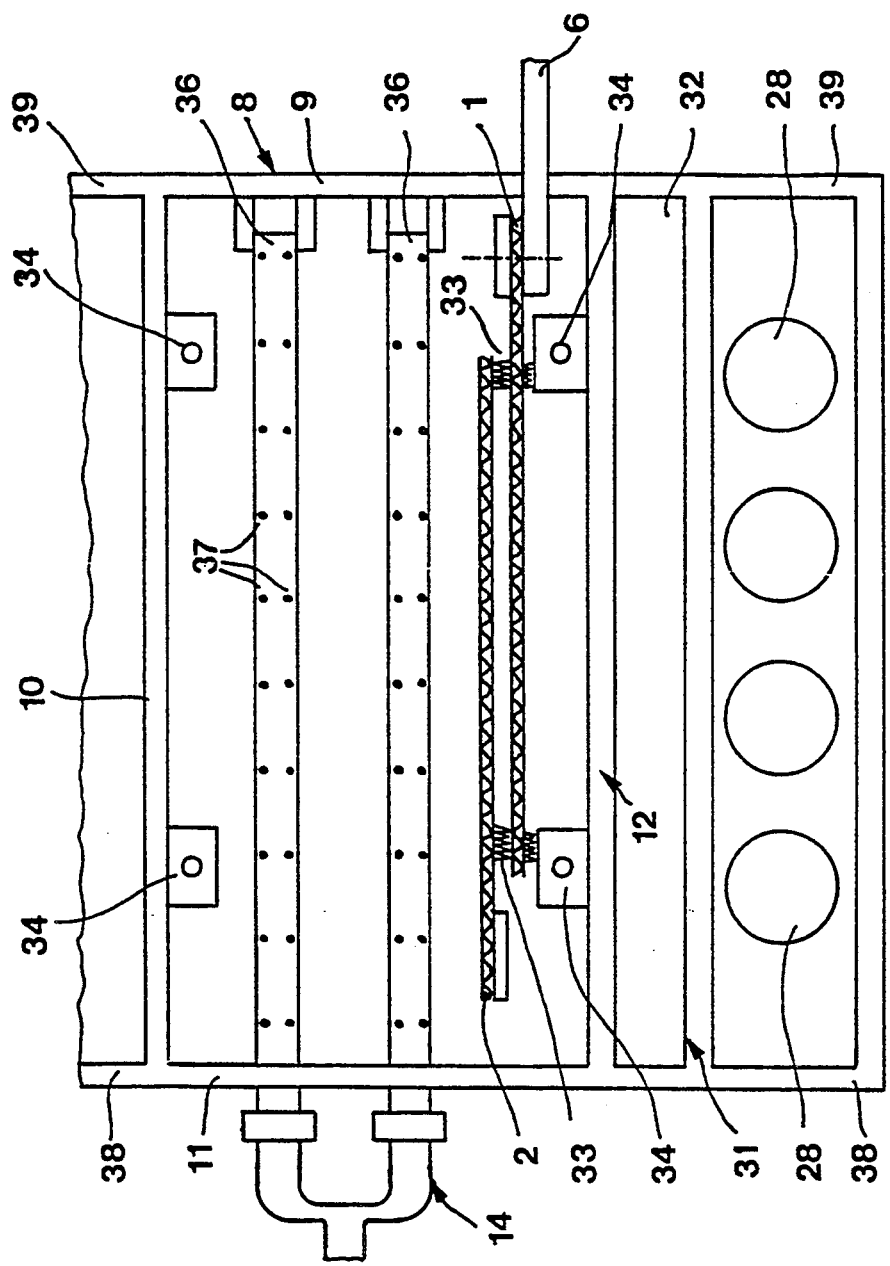
FIG. 4 is a top view detail of the cell housing located in the superstructure, with only one overflow provided along the side walls.

FIG. 4 is a top plan view of a cell housing 8, having the electrode packet, of which only one and 2 and one cathode 2 each can be seen, located in the superstructure in the upper region; solution-resistant electrically insulating spacer elements 33 are located between the electrodes 1, 2, in order to assure uniform spacing among the electrodes. The spacer elements 33 oriented toward the side wall 12 of the cell housing 8 are laterally supported by spacers 34, and all the electrodes 1, 2 are not assembled into the electrodes stack, not shown here, until assembly is complete. As already described above, the retention of the electrode stack is done with the aid of the power leads, of which only the positive power lead 6 is shown here for the sake of simplicity. The pipe distributor system 14 can also be seen, located in the lower region of the cell housing 8; in the present case, it has individual tubes 36 with outlet openings 37. The liquid circulation is again performed here by means of a pump, but it is not shown.

Unlike the other embodiments described above, in FIG. 4 there is only one overflow of the solution along the side walls 10 and 12; the end walls 9 and 11 and the adjoining wall regions 38, 39 have such a height as to assure the directed overflow into the collection container, serving as a degassing region, between the side wall 10 and the second overflow 31, which is also formed as a wall. After passing through the second overflow 31, the now-degassed solution returns to the solution container, not shown here, through the drain openings 28.

Various changes and modifications may be made, and features described in connection with any one of the embodiments may be used with any of the others, within the scope of the inventive concept.

We claim:

1. An electrochemical cell for electrolytic treatment of an aqueous solution, comprising
   a cell housing tub (8);

a plurality of plate anode (1) and cathode (2) electrodes, spaced apart from and parallel to one another in said cell, collectively defining an interchangeable electrode stack (3), with adjacent electrodes that have alternating polarity meshing with one another in a comb configuration, respective first (6) and second (7) power elements, each serving to provide electrical contact and mechanical retention to all the electrodes having a common polarity, by means of respective power feeders (4,5) of solution-resistant material welded laterally to the electrodes, means (26, 27, 14, 37) for circulating a flow of said aqueous solution from bottom to top of the electrodes along their electrode surfaces, and thence to a drain (28) leading to a container (16), wherein said cell housing tub (8) has an open top and has at least one sidewall (10, 12) defining a first overflow lip for degassing said solution during flow thereover;

the cell housing tub is surrounded, at least in the region of the first overflow lip, by a further wall (31) lower than said at least one sidewall (10, 12) and defining a second overflow lip and a collection container or sump (32) between said first overflow lip and said further wall (31), thereby forcing flowing solution to cascade over both said first and second overflow lips and assuring complete degassing;

a hood (18), extending over both said tub (8) and said first (10, 12) and second (31) overflow lips, contains any gas released during said degassing, and vent means (20, 21) are provided for removal of said gas contained by said hood (18).

2. The electrochemical cell of claim 1 characterized in that the walls (9, 10, 11, 12) of the cell housing tub (8) have a horizontal, encompassing edge forming the first overflow lip.

3. The electrochemical cell of claim 1, characterized in that walls of the collection container (32) have a horizontal, encompassing edge forming the second overflow lip (31).

4. The electrochemical cell of claim 1, characterized in that the electrode stack has a flow through it parallel to a short side of the electrode plates.

5. The electrochemical cell of claim 1, characterized in that the ratio of the width to the height of the electrode plates is in the range from 10:1 to 5:1.

6. The electrochemical cell of claim 1, characterized in that the power feeders (4, 5) of the cathodes (2) and anodes (1) are each secured to opposed short sides of the electrode plates.

7. The electrochemical cell of claim 1, characterized in that the power feeders (4, 5) are contact strips which are each secured, pointing upward, to the electrode surfaces adjacent electrode edges, and free ends of the contact strips extend upward out of the cell housing tub (8) and connect together at a power lead (6, 7) for electrical contact.

8. The electrochemical cell of claim 7, characterized in that the electrode stack (3) is inserted in suspended fashion into the cell housing by means of the power leads (6, 7).

9. The electrochemical cell of claim 1, characterized in that the electrodes (1, 2) comprise expanded metal.

* * * * *